(12) United States Patent
Chang

(10) Patent No.: US 7,739,041 B2
(45) Date of Patent: Jun. 15, 2010

(54) SAFETY NAVIGATION SYSTEM APPLYING WIRELESS COMMUNICATION TECHNOLOGY AND METHOD THEREFOR

(75) Inventor: Yu-Jen Chang, Taoyuan (TW)

(73) Assignee: Mitac International Corp., Taoyuan (TW)

( * ) Notice: Subject to any disclaimer, the term of this patent is extended or adjusted under 35 U.S.C. 154(b) by 761 days.

(21) Appl. No.: 11/686,819

(22) Filed: Mar. 15, 2007

(65) Prior Publication Data

US 2007/0219717 A1   Sep. 20, 2007

(30) Foreign Application Priority Data

Mar. 17, 2006   (CN)   ............................. 95 1 09356

(51) Int. Cl.
*G01C 21/32* (2006.01)
(52) U.S. Cl. ...................................... 701/210; 701/209

(58) Field of Classification Search ......... 701/207–213, 701/330, 301; 340/995.12–995.21
See application file for complete search history.

(56) References Cited

U.S. PATENT DOCUMENTS

| 6,950,745 | B2 * | 9/2005 | Agnew et al. ............... 701/210 |
| 6,968,272 | B2 * | 11/2005 | Knockeart et al. .......... 701/210 |
| 6,980,907 | B2 * | 12/2005 | Umezu et al. ............... 701/210 |

* cited by examiner

*Primary Examiner*—Richard M. Camby
(74) *Attorney, Agent, or Firm*—Workman Nydegger

(57) ABSTRACT

A safety navigation system applying wireless communication technology and a method therefor are provided, wherein road information transmitted by wireless communication technology is received and statistically analyzed to learn about road sections that are inconvenient for driving or cannot be passed through, so as to decelerate when driving on the road section or avoid the road section altogether when planning routes, thereby ensuring a driver's safety.

15 Claims, 5 Drawing Sheets

| | | |
|---|---|---|
| second road section 322 | 2003/11/3 | car accident |
| second road section 322 | 2004/2/5 | traffic jam |
| second road section 322 | 2004/5/16 | car accident |
| second road section 322 | 2004/7/23~ 2004/8/23 | road blockage |
| second road section 322 | 2004/8/10 | traffic jam |
| second road section 322 | 2004/11/29 | car accident |

SAFETY NAVIGATION SYSTEM APPLYING WIRELESS COMMUNICATION TECHNOLOGY AND METHOD THEREFOR

CROSS-REFERENCE TO RELATED APPLICATIONS

This non-provisional application claims priority under 35 U.S.C. §119(a) on Patent Application No(s). 095109356 filed in Taiwan, R.O.C. on Mar. 17, 2006, the entire contents of which are hereby incorporated by reference.

BACKGROUND OF THE INVENTION

1. Field of Invention

The present invention relates to a navigation system and method therefor, and more particularly to a safety navigation system and method therefor wherein road information transmitted by wireless communication technology is received and statistically analyzed, thereby achieving the purpose of safe navigation.

2. Related Art

At present, an in-vehicle navigation system positions a vehicle and shows its location on a map mainly according to information received by a GPS receiver or other device, plans the optimal path to the destination according to the user's requirements, displays the position of the vehicle by way of graphic representation, and sends guide instructions to the user in a timely way by voice or through graphics according to the generated route and the position of the vehicle. However, in the event of road blockage, road construction, traffic control, or poor weather, the information cannot be reflected in the navigation system in time, and so the in-vehicle navigation system cannot always provide the best navigation service to the user. As such, it is necessary to send real-time traffic information to vehicles traveling on the road, thereby allowing the in-vehicle navigation system to provide a real-time dynamic route planning service.

Additionally, a radio data system (RDS) is used to provide real-time road information. The RDS is developed by the European Broadcasting Union (EBU) and is used to provide voice and data communication through the FM wave band without establishing a particular connection channel. After the RDS medium appeared, the Traffic Management Center (TMC) was developed to send precise real-time road information via the RDS. Currently, TMC is widely used in commercial applications in Europe and the United States. However, even though TMC provides real-time road information, a driver unfamiliar with local driving routes still cannot easily change his/her route, so TMC does not fully achieve its potential.

Therefore, the in-vehicle navigation system and TMC must be used simultaneously in order to fully achieve the application efficacy. It can be appreciated that when TMC is integrated with the in-vehicle navigation system, the navigation system may select other driving routes according to the road information provided by TMC, enabling the driver to keep away from road sections where an accident or traffic block has occurred. However, the application solution of integrating the in-vehicle navigation system and TMC hasn't appeared yet, thus, even though the driver uses these two systems simultaneously, he/she must still manually enter the road information provided by TMC and request the navigation system to re-plan the route, which is quite inconvenient while driving.

Additionally, although TMC can be used to obtain real-time road information, it is limited to this only. Certain road sections where traffic problems often occur, such as traffic jams, traffic accidents, or dense fog, are not avoided from the very beginning of route planning, so the driver may easily suffer setbacks when driving on those road sections where problems often occur.

SUMMARY OF THE INVENTION

According to one aspect of the invention, a system is provided for safety navigation. The system includes a data signal receiving module, a data signal transfer module, a database, a specific road section determination module, a route planning module, and a suggestion module.

According to another aspect of the invention, a method is provided for safety navigation. The method includes the following steps: receiving a data signal through wireless communication; analyzing the data signal to obtain road information and then storing the road information in the database; reading all the road information stored in the database and defining a specific road section via statistical analysis; re-planning a route going through or not going through the specific road section; and displaying the re-planned route.

Accordingly, it is an object of the present invention to provide a safety navigation system and a method therefor, wherein road information transmitted by wireless communication technology is received and statistically analyzed, so as to be able to decelerate when encountering road sections that are inconvenient for driving or to avoid road sections that are blocked. Through the safety navigation system and method therefor in the present invention, the road sections that are inconvenient for driving or are blocked are learned about while driving, such that when planning routes, the speed is reduced for road sections that are inconvenient for driving and road sections that are blocked are avoided when planning the route, thereby ensuring a driver's safety.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given herein below for illustration only, which thus is not limitative of the present invention, and wherein.

DETAILED DESCRIPTION OF THE INVENTION

The object of the present invention is achieved through two parts: a system and a method. Firstly, FIG. 1 shows a system architectural view of a safety navigation system and a method therefor, and the system operation of the present invention is illustrated with reference to FIG. 1.

Figure 1:
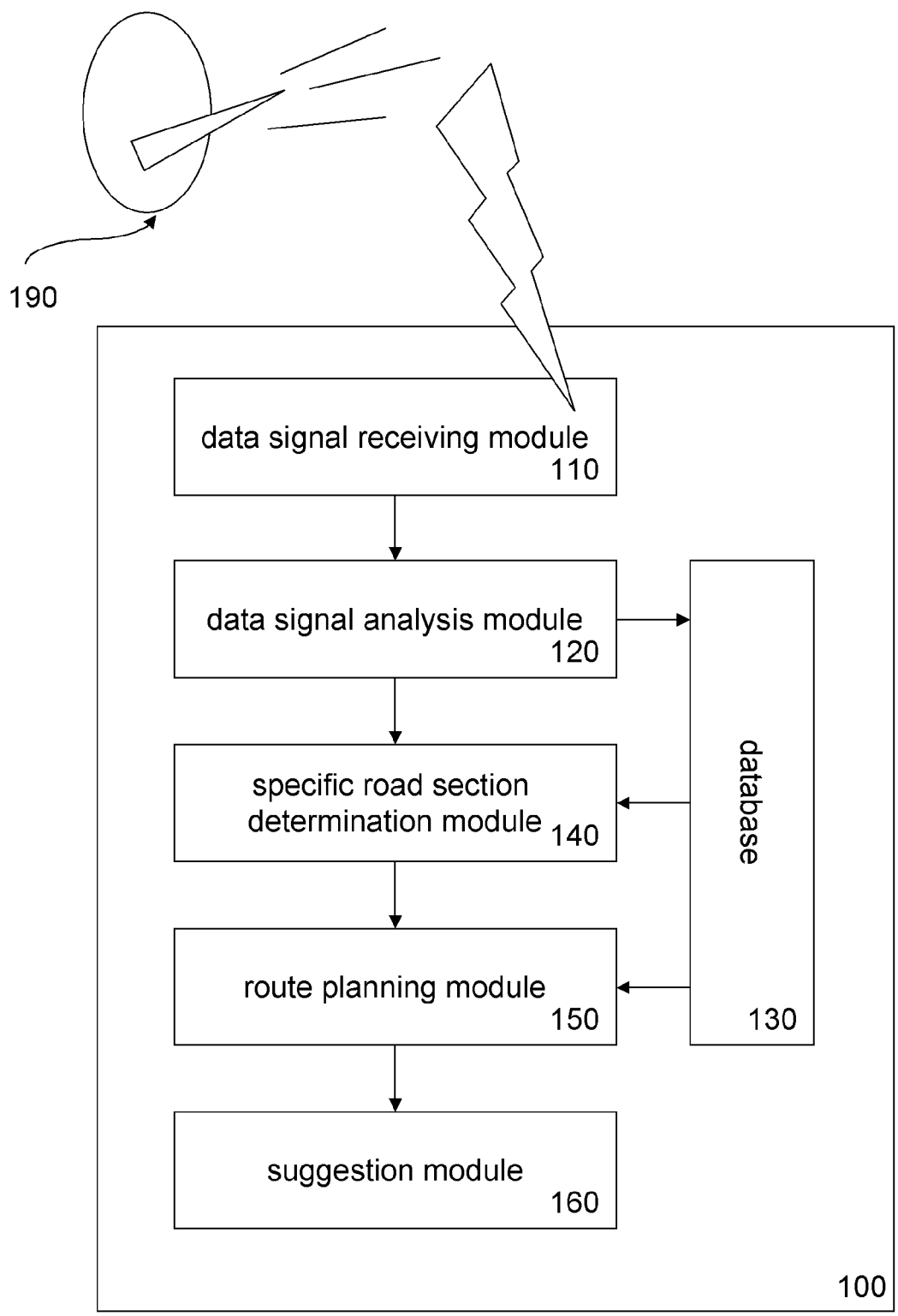
FIG. 1 is an architectural view of the safety navigation system and the method therefor according to present invention.

As shown in FIG. 1, the system of the present invention comprises a data signal receiving module 110, a data signal transfer module 120, a database 130, a specific road section determination module 140, a route planning module 150, and a suggestion module 160. The data signal receiving module 110 is responsible for receiving a data signal transmitted by wireless communication technology. The data signal transfer module 120 is responsible for analyzing the data signal received by the data signal receiving module 110 to obtain the road information recorded therein, wherein the road information comprises at least a traffic event and a road section where the traffic event has occurred, and then the road information is stored into the database 130. The database 130 is responsible for storing the road information including the traffic event and the road section where the traffic event occurs. After the road information analyzed by the data signal transfer module 120 is stored in the database 130, the specific road section determination module 140 is responsible for reading all road information stored in the database 130, statistically analyzing all the road information, determining the specific road sections where the various traffic events occur, classifying the specific road sections into at least the road sections that are inconvenient for driving and the road sections that cannot be passed through, and enabling the route planning module 150. The route planning module 150 is responsible for re-planning a route passing or not passing through each specific road section according to the specific road sections determined by the specific road section module 140 and submitting the planned route to the suggestion module 160 to display the route planning. The suggestion module 160 is responsible for displaying the route planned by the route planning module 150, wherein the so-called road sections that are inconvenient for driving include the road section under such conditions as, for example, heavy rain, snow, dense fog, more than a predetermined number of traffic accidents, more than a specific number of casualties in traffic accidents, road construction, traffic lane reduction, constant traffic jams, etc.

Figure 2:
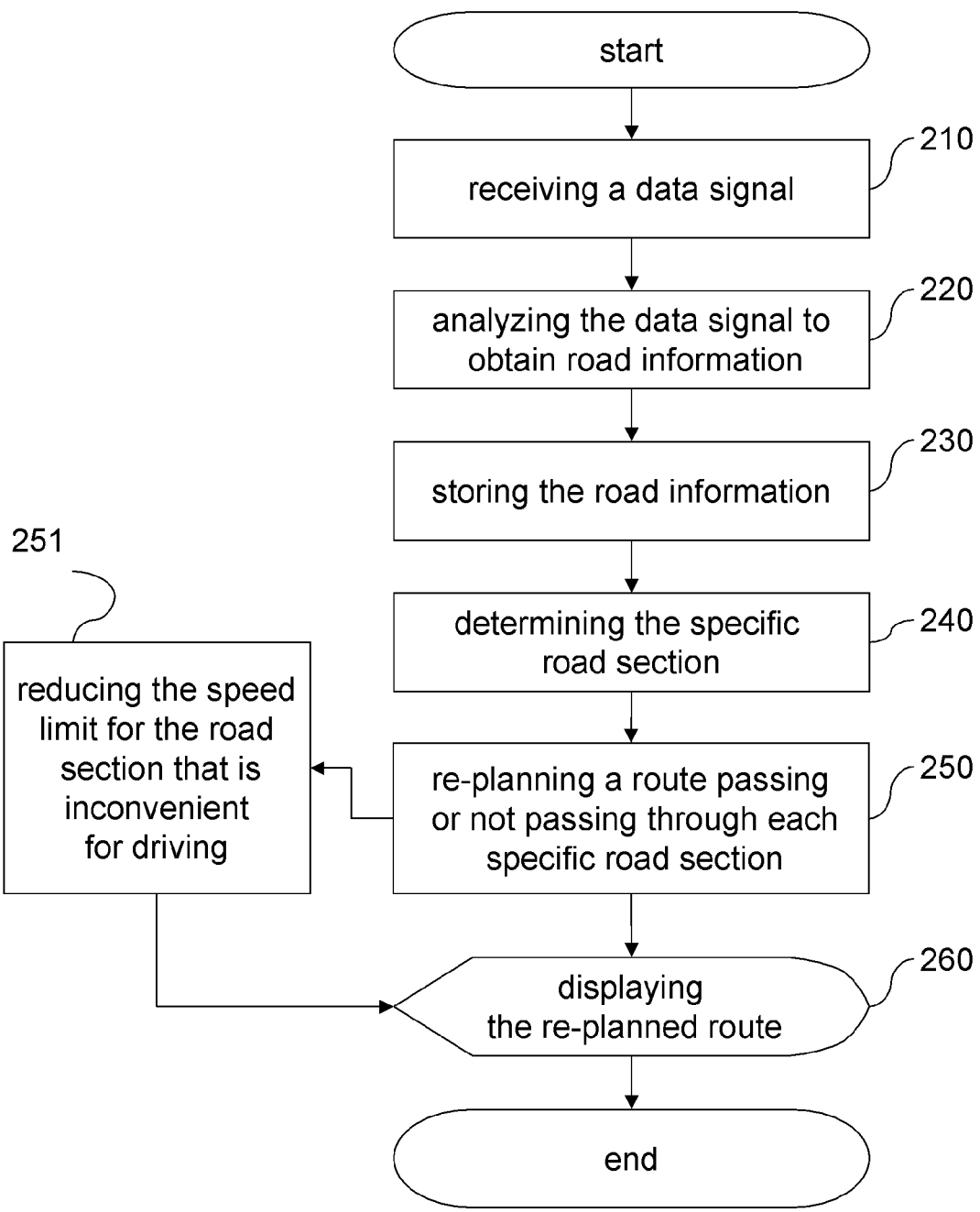
FIG. 2 is a flow chart of the navigation method of the safety navigation system and the method therefor according to present invention.

Please refer to FIG. 2 of a flow chart of the safety navigation system and the method therefor according to present invention. When the driver uses the navigation device 100 with the system of the present invention, firstly, the data signal receiving module 110 receives a data signal transmitted by a radio signal transmitting station 190 through radio communication (Step 210). When the data signal receiving module 110 receives the data signal, the data signal transfer module 120 analyzes the data signal to obtain road information including the traffic event and the road section where the traffic event has occurred (Step 220). After being analyzed, the road information is stored in the database 130 (Step 230). Then, the specific road section determination module 140 reads all the road information stored in the database 130, statistically analyzes all the road information according to predetermined criteria, and then determines and classifies the road section where the traffic event has occurred into either a road section that is inconvenient for driving or a road section that cannot be passed through (Step 240). Subsequently, the route planning module 150 re-plans a route passing or not passing through each specific road section according to the specific road sections determined by the specific road section determination module 140 (Step 250), and the suggestion module 160 display the re-planned route (Step 260).

Figure 3A:
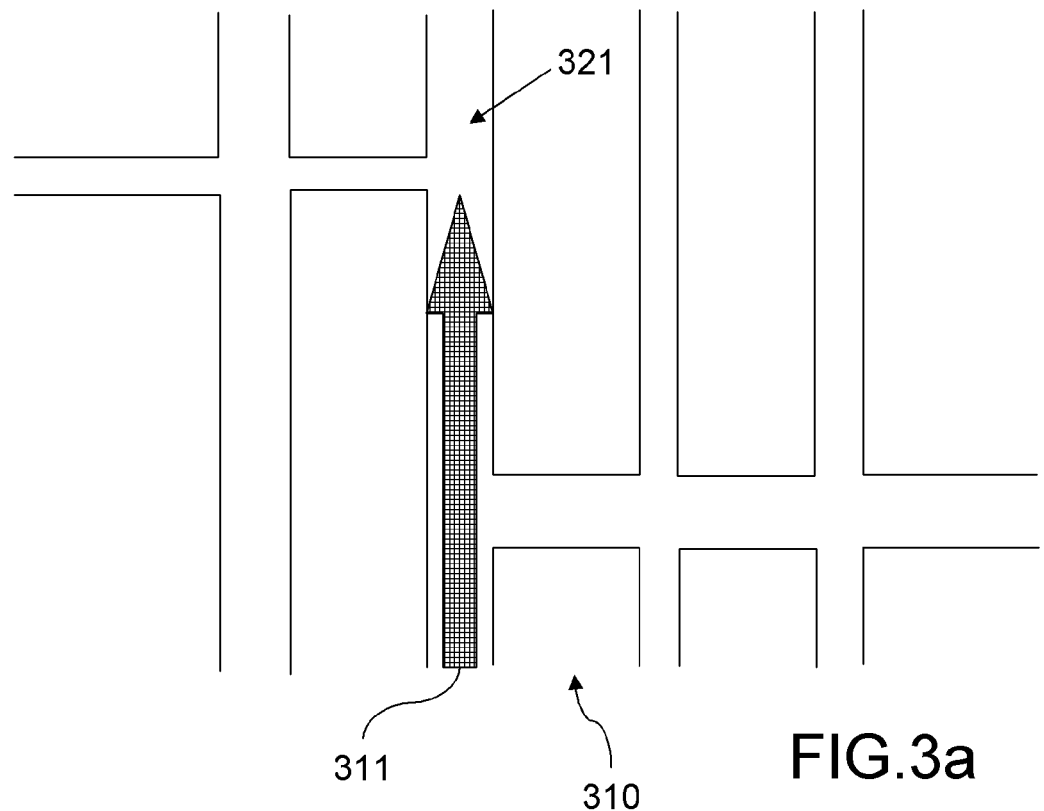
FIGS. 3a, 3b, and 3c are schematic views of a route planned by the navigation system according to an embodiment of the present invention.
Figure 3B:
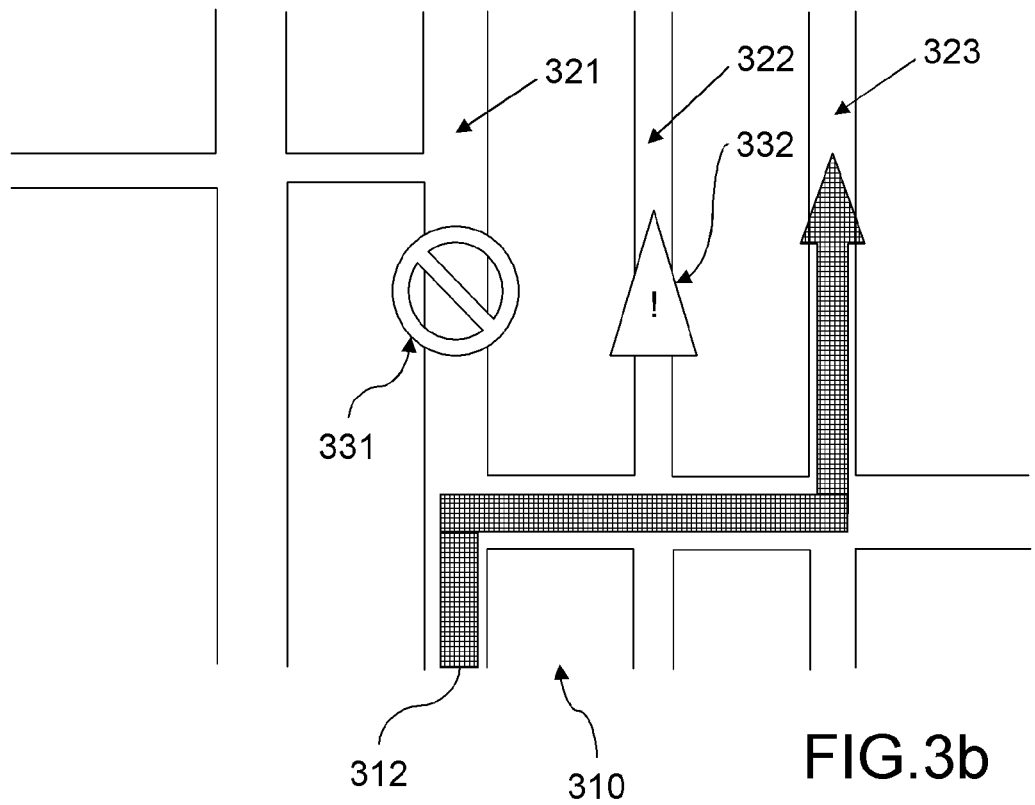
Figures 3C, 3D:
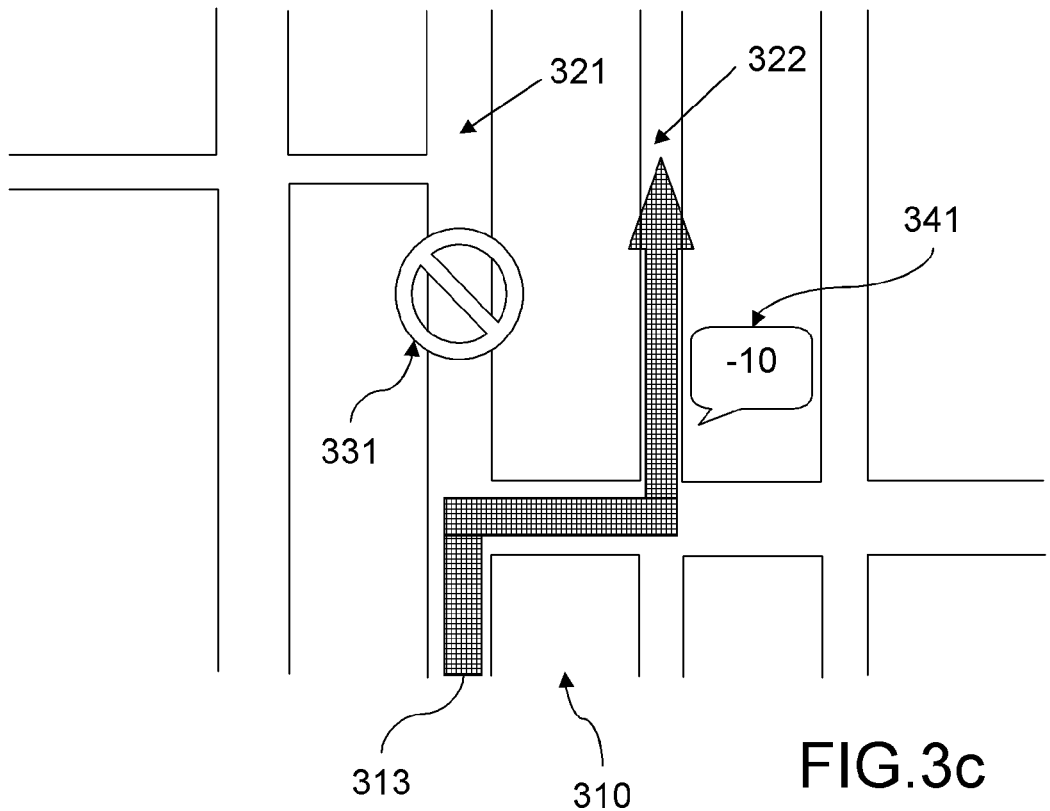
FIG. 3d is a traffic event list according to the embodiment of the present invention.
Figure 4A:
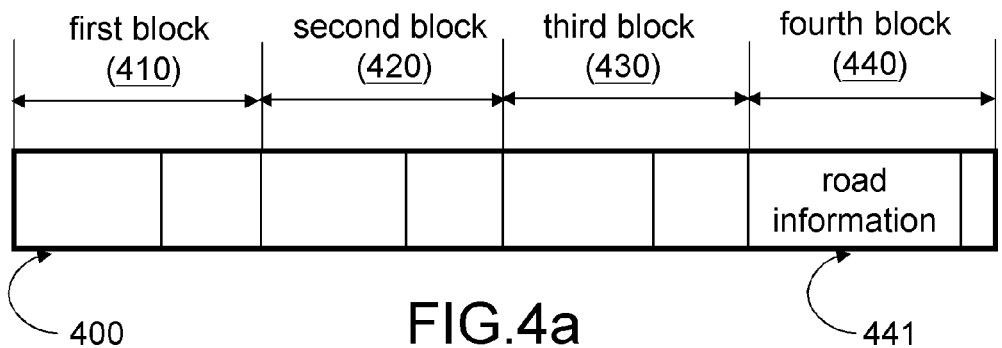
FIGS. 4a and 4b are TMC data formats according to the embodiment of the present invention.
Figure 4B:
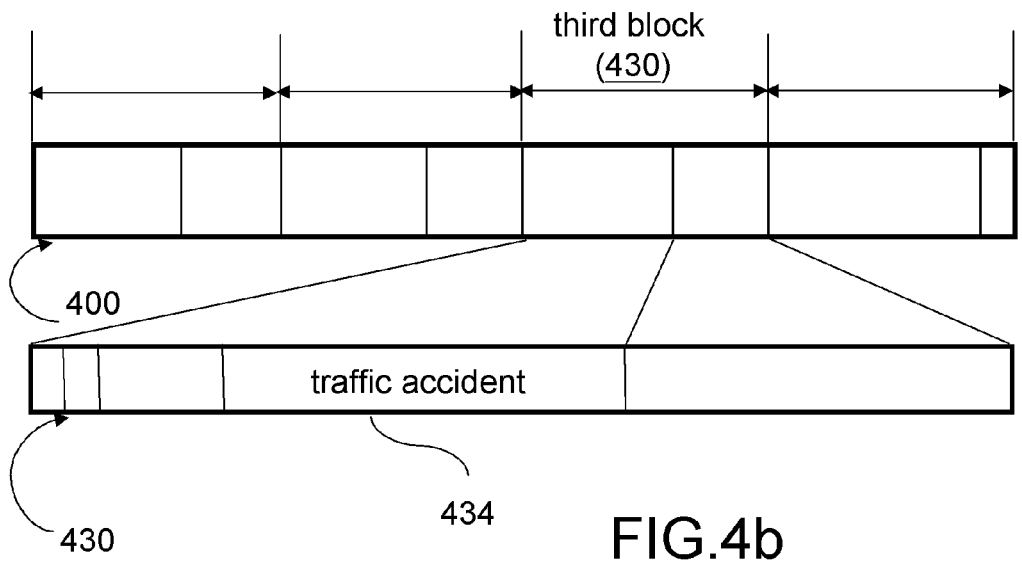

Next, the operation system and method of the present invention are illustrated through an embodiment using TMC to obtain real-time road information. As shown in FIG. 3a, after the driver activates the navigation system of the present invention, the system plans a route 311 displayed on the navigation map 310 and provides it to the driver as a reference. Meanwhile, the system of the present invention begins receiving the data signal transmitted through TMC, wherein the format of the data signal transmitted through TMC is as shown in FIGS. 4a and 4b. After being received, the first data signal 400 is analyzed, and divided into four blocks: a first block 410, a second block 420, a third block 430, and a fourth block 440. According to the initial definition of the data signal transmitted by TMC, it is ensured that the third block 430 contains an event information code 434 and the fourth block contains a required road section information code 441. After the data signal has been analyzed, the event information code 434 and the road section information code 441 of the data signal are obtained. Based upon a look-up table, it can be known that the event information code 434 indicates a traffic accident, and the road section information code 441 indicates that the road section where the event has occurred is the first road section 321 ahead. Thus, the event of a traffic accident and the road section where the traffic accident occurs are stored in the database, and a first symbol 331 is displayed at the first road section 321 to indicate that the traffic event has occurred there. Then, all the data stored in the database is read and statistically analyzed, and it can be known that traffic events have occurred on the adjacent second road section 322 from a traffic even list 350, so the second road section 322 is determined to be a specific road section. Since a traffic accident has occurred on the second road section 322, as shown in FIG. 3d, the second road section 322 is classified as a road section that is inconvenient for driving according to the predetermined criterion of the present invention. Further, the traffic event that occurred on the first road section 321 is an accident, such that the first road section 321 cannot be passed through by any vehicle, and thus, the second road section 322 is selected as an optimal route. Furthermore, if the second road section 322 where a traffic accident has occurred is classified as the road section that cannot be passed through according to the predetermined criterion of the present invention, the third road section 323 is selected as the final planned route 312, and the first symbol 331 and the second symbol 332 respectively appear on the first road section 321 and the second road section 322 to suggest the driver not to travel there, as shown in FIG. 3b.

Besides the aforementioned functions of the present invention, the database 130 also stores the occurrence time of each road event or the speed limit of the specific road section in advance. The specific road section determination module 140 is further used to change the criterion for determining a specific road section, so as to filter and select the read road information, and then statistically analyze the filtered road information. The route planning module 150 is further responsible for reducing the speed limit for the road section that is inconvenient for driving (Step 251). Therefore, the present invention further comprises the follow steps. In Step 230, the database 130 stores the road information together with the occurrence time of a traffic event. If the traffic event has an end time, the database 130 also stores the end time in the road information. In Step 240, the criterion for the specific road section determination module 140 to determine a specific road section is defined as follows: whether or not a traffic event has occurred on the road section, the number of traffic events that have occurred on the road section, the severity level of the traffic event that have occurred on the road section, the occurrence time or the end time of the road events stored in the database 130, etc, and the route is re-planned after statistically analyzing the road information filtered according to the aforementioned criterion. If the re-planned route involves a road section inconvenient for driving, the speed limit for that specific road section is reduced.

Next, the additional operation system and method of the present invention are also illustrated through the above-mentioned embodiment. As shown in FIG. 3c, the road information of the second road section 322 received and analyzed in the present invention is heavy rain. Because the heavy rain reduces the visual field for driving, the present invention classifies the second road section 322 as a road section inconvenient for driving and a reducing maximum speed limit symbol 341 is displayed for requesting the driver to reduce the speed limit at the second road section 322 from the predetermined 50 km/hr to 40 km/hr. When the driver drives the car at a speed of more than 40 km/hr, the present invention will inform the driver that the speed limit has been exceeded. Further, if the criterion for determining a road section to be a specific road section is that the total number of traffic events is 20, the planned route 313 passes through the adjacent second road section 322. However, if the criterion for determining a road section to be a specific road section is changed so that the total number of traffic events is 5, as shown in FIG. 3d, since the total number of traffic events that have occurred on the second road section 322 is more than 5, the present invention determines and classifies the second road section 322 as the road section inconvenient for driving. Therefore, the route 313 planned by the present invention passes through the second road section 322, as shown in FIG. 3c, and the maximum speed limit for the second road section 322 is reduced from 50 km/hr to 40 km/hr, and the driver is informed of this. If the criterion for determining the specific road section is set to be the number of traffic accidents, since the number of traffic accidents that have occurred on the second road section 322 adjacent to the first road section 321 is less than 5, the route 313 planned by the present invention still passes through the second road section 322, as shown in FIG. 3d.

If the driver cancels the setting of the accumulated number of traffic events and sets it instead to determine a specific road section according to traffic accidents or traffic jams, as shown in FIG. 3d, the present invention classifies the second road section 322 as a road section that cannot be passed through, because traffic accidents or traffic jams have occurred there. Therefore, the planned route 313 passes through the third road section 323, instead of the second road section 322. If the driver does not adjust the criterion of the total number of traffic events that have occurred on the specific road section, but changes the occurrence time to be within the latest year, the planned path still passes through the second road section 322 as shown in FIG. 3c, because the occurrence time for all of the traffic events occurred there are all over one year, as shown in FIG. 3d. If today is Aug. 25, 2004 then the planned route 313 can pass through the second road section 322 because the end time of a "road blockage" traffic event 354 is passed and the total number of traffic events occurred on the second road section 322 is less than 5 times.

The determination criterion classifies traffic events into four levels, namely, traffic jams, dense fog, traffic accidents, and fatal traffic accidents. If a traffic event occurs on the first road section 321 resulting in the road's being closed and the severity thereof is determined to be the second level according to the determination criterion, i.e., the road section with dense fog or where a traffic accident has occurred, as shown in FIG. 3b. In addition, three traffic accidents have occurred on the second road section 322, thus, the route planned by the present invention passes through the third road section 323 instead of the second road section 322. If the severity level is changed to a fatal traffic accident, the route planned by the present invention passes through the second road section 322, as shown in FIG. 3c, because no traffic accident with death has ever occurred on the second road section 322.

Figure 5:
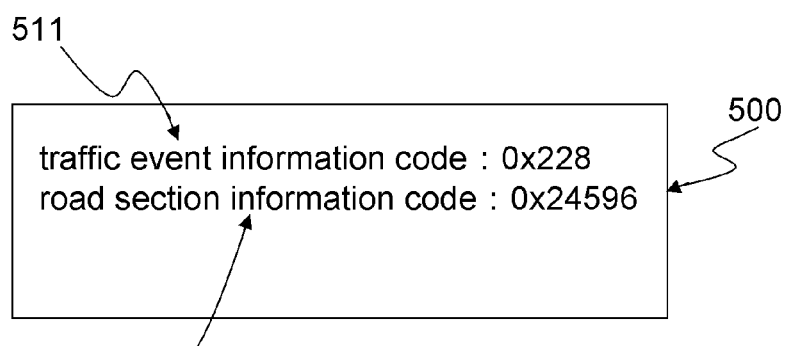
FIG. 5 is an SMS data format according to the embodiment of the present invention.

Besides TMC, Global Packet Radio System (GPRS), or Short Messaging Service (SMS), other radio communication technologies may also be used to transmit road information in the present invention, as shown in FIG. 5. Taking SMS as an example, a second data message 500 transmitted by SMS comprises a traffic event information code 511 and a road section information code 512 where the traffic event has occurred. After the present invention receives and analyzes the second data message 500, the traffic event code 511 and the road section information code 512 are converted into traffic events that have occurred and the road section where the traffic events have occurred according to the look-up table, and then provided to the navigation system to plan a safe route through the same method as that mentioned above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A safety navigation system for conducting safe navigation by applying wireless communication to transmit road information, comprising:
   a data signal receiving module for receiving a data signal transmitted through the wireless communication;
   a data signal transfer module for transferring the data signal into road information having at least a traffic event and a road section where the traffic event has occurred;
   a database for storing the road information;
   a specific road section determination module for statistically analyzing the road information after the road information has been stored, so as to determine at least one specific road section, and then classify one of at least the specific road sections into those which are inconvenient for driving or those which cannot be passed through according to the traffic event in the road information as two severity levels;
   a route planning module for re-planning a route and determining whether each of the specific road sections is included in the route or not according to the classification of the specific road sections; and
   a suggestion module for displaying the re-planned route.

2. The safety navigation system as claimed in claim 1, wherein the specific road section determination module further filters, selects and statistically analyzes the road information according to each of the severity levels.

3. The safety navigation system as claimed in claim 1, wherein the road information stored in the database further comprises an occurrence time and ending time corresponding to the traffic event.

4. The safety navigation system as claimed in claim 1, wherein the database stores at least one speed limit in advance, and the speed limit corresponds to one of the specific road sections.

5. A safety navigation method, applying wireless communication to transmits road information, comprising:
   (a) receiving a data signal transmitted through the wireless communication;
   (b) analyzing the data signal into road information having at least a traffic event and a road section where the traffic event has occurred;
   (c) storing the road information in a database;
   (d) reading at least one item of road information from the database and statistically analyzing the road information, so as to pick up at least one specific road section, and then classifying one of the specific road sections into at least the road sections inconvenient for driving and the road sections that cannot be passed through according to the traffic event in the road information;
   (e) re-planning a route and determining whether each of the specific road sections is included in the route or not according to the classification of the specific road sections; and
   (f) suggesting the re-planned route.

6. The safety navigation method as claimed in claim 5, wherein the statistically analyzing the road information in step (d) further comprises a step of determining a road has at least one record having the road information, defining the road as the specific road section.

7. The safety navigation method as claimed in claim 5, wherein the determination criteria in step (d) further comprises a step of determining the times a road section being classified and if the classified times accumulated bigger than a default value, picking up the road section as the specific road section.

8. The safety navigation method as claimed in claim 5, wherein the determination criteria in step (d) further comprises a step of:
   determining a severity level for each of the traffic events, filtering and selecting the read road information according to each of the severity levels, and then statistically analyzing the road information.

9. The safety navigation method as claimed in claim 5, wherein the road information stored in the database in step (c) further comprises an occurrence time corresponding to the traffic events.

10. The safety navigation method as claimed in claim 9, wherein the determination criteria in step (d) further comprises a step of:
    filtering and selecting the read road information according to the occurrence time and then statistically analyzing the road information.

11. The safety navigation method as claimed in claim 5, wherein the database further stores at least one speed limit in advance, and the speed limit corresponds to one of the specific road sections.

12. The safety navigation method as claimed in claim 11, wherein step (e) further comprises a step of:
    reducing the speed limit for at least one of the road sections inconvenient for driving in the re-planned route.

13. The safety navigation method as claimed in claim 11, wherein the road information further comprise a period information to show a period a traffic event supposed to last.

14. The safety navigation method as claimed in claim 13, wherein the database stored previous road information, and step (c) further comprise a step to update the road information according to the period information in road information.

15. A safety navigation method, applying wireless communication to transmits road information, comprising:
    receiving a data signal transmitted through the wireless communication
    analyzing the data signal into road information having at least a traffic event and a road section where the traffic event has occurred;
    statistically analyzing the road information according to a predetermined criteria, so as to pick up at least one specific road section, and then classifying the specific road sections into at least the road sections inconvenient for driving and the road sections that cannot be passed through according to the traffic event in the road information;
    re-planning a route and determining whether each of the specific road sections is included in the route or not according to the classification of the specific road sections; and
    re-planning a route.

* * * * *